United States Patent
Yamasaki

(10) Patent No.: US 11,005,383 B2
(45) Date of Patent: May 11, 2021

(54) SWITCHING POWER SUPPLY DEVICE FOR SWITCHING BETWEEN A SYNCHRONOUS AND AN ASYNCHRONOUS RECTIFICATION CONTROL

(71) Applicant: Yazaki Corporation, Tokyo (JP)

(72) Inventor: Yoshihiro Yamasaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/747,958

(22) Filed: Jan. 21, 2020

(65) Prior Publication Data
US 2020/0186049 A1 Jun. 11, 2020

Related U.S. Application Data

(63) Continuation of application No. PCT/JP2018/019670, filed on May 22, 2018.

(30) Foreign Application Priority Data

Jul. 27, 2017 (JP) .............................. JP2017-145042

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0009* (2013.01)

(58) Field of Classification Search
CPC ............... H02M 3/33592; H02M 1/08; H02M 2001/0009; H02M 3/33507; H02M 3/33523

See application file for complete search history.

(56) References Cited

U.S. PATENT DOCUMENTS 6,049,471 A * 4/2000 Korcharz .......... H02M 3/33515
                                                              363/20
10,110,138 B1 * 10/2018 Murthy-Bellur ...........................
                                                              H02M 3/33584

(Continued)

FOREIGN PATENT DOCUMENTS

JP      2010-206858 A    9/2010
JP      2014-197942 A    10/2014

(Continued)

*Primary Examiner* — Kyle J Moody
*Assistant Examiner* — Lakaisha Jackson
(74) *Attorney, Agent, or Firm* — Sughrue Mion, PLLC

(57) ABSTRACT

A switching power supply device includes a switching circuit including first switching elements, a rectification circuit including second switching elements, a smoothing circuit, and a controller. The controller performs switching between synchronous rectification control for driving the second switching elements and in synchronization with the switching circuit and asynchronous rectification control for driving the second switching elements independently of the switching circuit, and performs feedback control based on a normal duty on the first switching elements and the second switching elements. When the synchronous rectification control is switched to the asynchronous rectification control, the controller replaces the normal duty with a switching duty different from the normal duty and performs feedback control by the normal duty after the synchronous rectification control is switched to the asynchronous rectification control.

4 Claims, 11 Drawing Sheets

(56) References Cited

U.S. PATENT DOCUMENTS

| | | | |
|---|---|---|---|
| 2004/0109335 A1 | 6/2004 | Gan et al. | |
| 2014/0241018 A1* | 8/2014 | Hwang | H02M 1/32 |
| | | | 363/53 |
| 2016/0105094 A1* | 4/2016 | Tang | H02M 3/33507 |
| | | | 363/21.01 |
| 2017/0047855 A1* | 2/2017 | Yang | H02M 1/38 |
| 2017/0261910 A1* | 9/2017 | Kasamatsu | G03G 15/80 |
| 2019/0267886 A1* | 8/2019 | Hung | H02M 3/33569 |
| 2019/0288606 A1* | 9/2019 | Higaki | H02J 7/0068 |

FOREIGN PATENT DOCUMENTS

| | | |
|---|---|---|
| JP | 2014-197943 A | 10/2014 |
| JP | 2014-236596 A | 12/2014 |

* cited by examiner

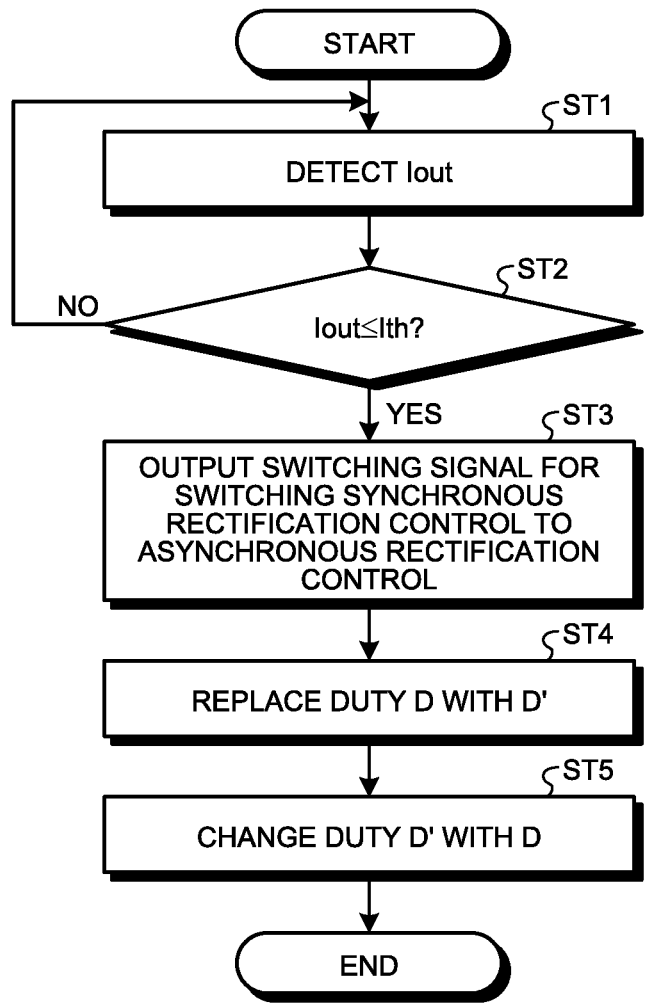

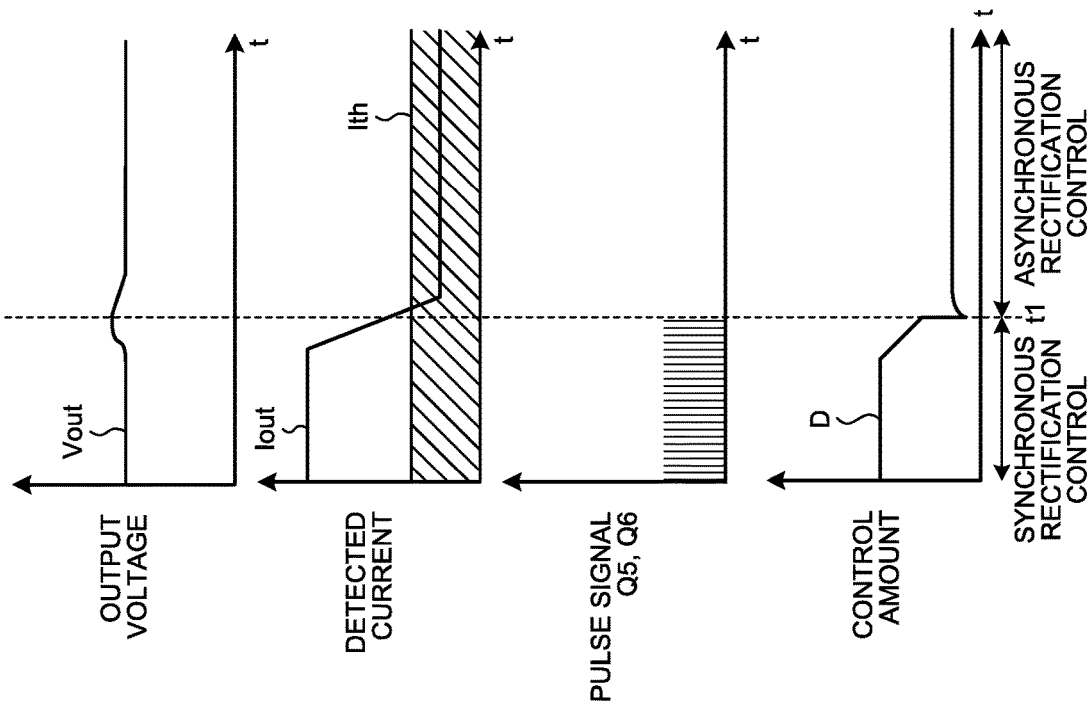
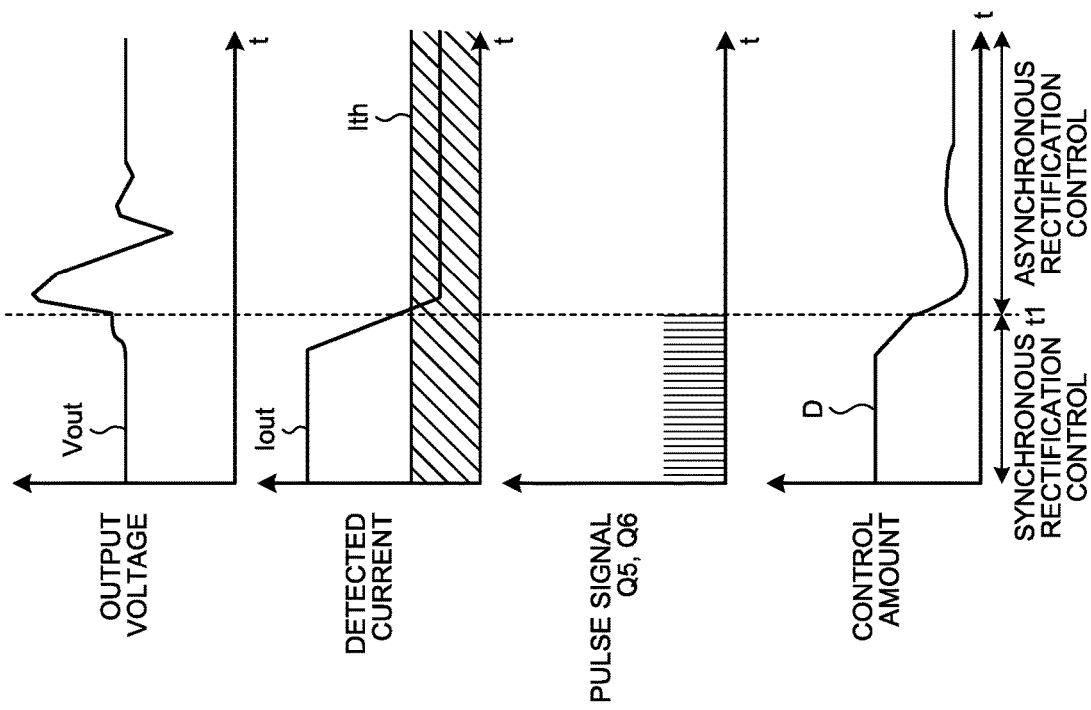

SWITCHING POWER SUPPLY DEVICE FOR SWITCHING BETWEEN A SYNCHRONOUS AND AN ASYNCHRONOUS RECTIFICATION CONTROL

CROSS-REFERENCE TO RELATED APPLICATION(S)

This application is a continuation application of International Application PCT/JP2018/019670, filed on May 22, 2018, and designating the U.S., the entire contents of which are incorporated herein by reference.

BACKGROUND OF THE INVENTION

1. Field of the Invention

The present invention relates to a switching power supply device.

2. Description of the Related Art

In the related art, a switching power supply device used for a DC/DC converter and the like includes a switching circuit that converts a DC voltage into an AC voltage, and a rectification circuit that converts the AC voltage converted by the switching circuit into a DC voltage. In order to improve power conversion efficiency and prevent current backflow, the switching power supply device performs synchronous rectification control for synchronizing the rectification circuit with the switching circuit and asynchronous rectification control for independently driving the switching circuit and the rectification circuit.

For example, Japanese Patent Application Laid-Open No. 2010-206858 discloses a technology of switching synchronous rectification control and asynchronous rectification control according to whether a synthesized signal of an output voltage and an output current is larger or smaller than a reference voltage.

However, when switching the synchronous rectification control to the asynchronous rectification control, a large fluctuation occurs in an output voltage. Since the output voltage fluctuates greatly, durability of each element, a load and the like may be reduced.

SUMMARY OF THE INVENTION

The present invention has been made to solve the aforementioned problems, and an object of the present invention is to propose a switching power supply device capable of suppressing a fluctuation in an output voltage, which occurs when switching synchronous rectification control to asynchronous rectification control.

In order to achieve the above objection, a switching power supply device according to one aspect of the present invention includes a switching circuit that converts a DC voltage into an AC voltage and includes a first switching element; a rectification circuit that rectifies the AC voltage converted by the switching circuit into a DC voltage and includes a second switching element; a smoothing circuit that smooths the rectified DC voltage; a controller that performs switching between synchronous rectification control for driving the second switching element in synchronization with the switching circuit and asynchronous rectification control for driving the second switching element independently of the switching circuit, and performs feedback control on the first switching element and the second switching element; an input voltage detector that detects a voltage on an input side; an output voltage detector that detects a voltage on an output side; and a current detector that detects a current flowing through the switching circuit or the rectification circuit, wherein when switching the synchronous rectification control to the asynchronous rectification control, the controller replaces a normal duty with a switching duty different from the normal duty and performs the feedback control by the normal duty after the synchronous rectification control is switched to the asynchronous rectification control, the normal duty is determined based on an output voltage value, and the switching duty is determined based on an input voltage value, an output voltage value, a detected current value, a switching frequency, and an inductance value of the rectification circuit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart of an operation example of the switching power supply device in the first embodiment;

FIGS. 5A and 5B are diagrams illustrating an example of switching synchronous rectification control to asynchronous rectification control in a comparative example and the first embodiment, respectively;

DETAILED DESCRIPTION OF THE PREFERRED EMBODIMENTS

Hereinafter, embodiments of a switching power supply device according to the present invention will be described in detail on the basis of the drawings. It is noted that the invention is not limited by these embodiments.

First Embodiment

Figure 1:
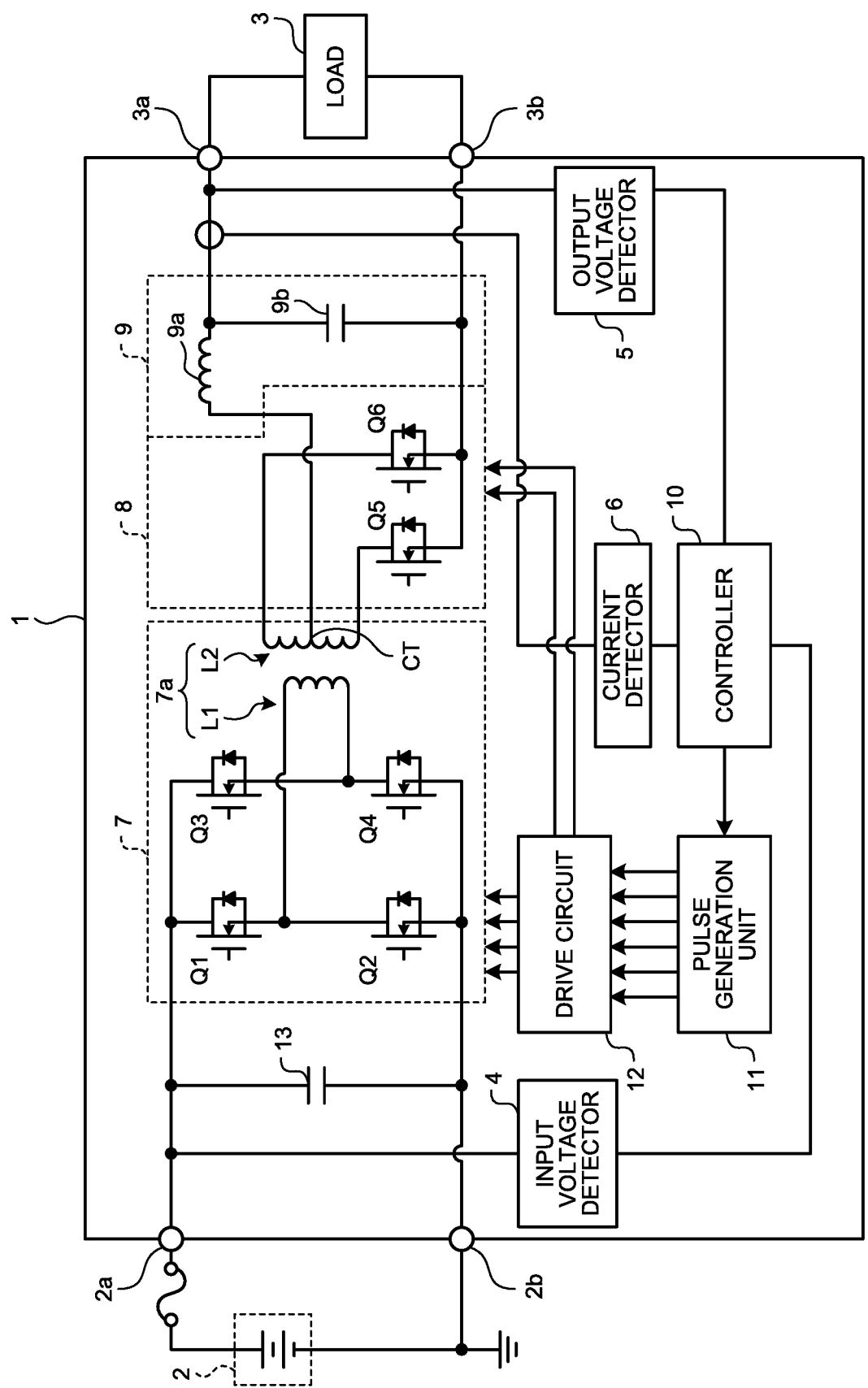
FIG. 1 is an overall diagram illustrating a switching power supply device in a first embodiment.
Figure 2:
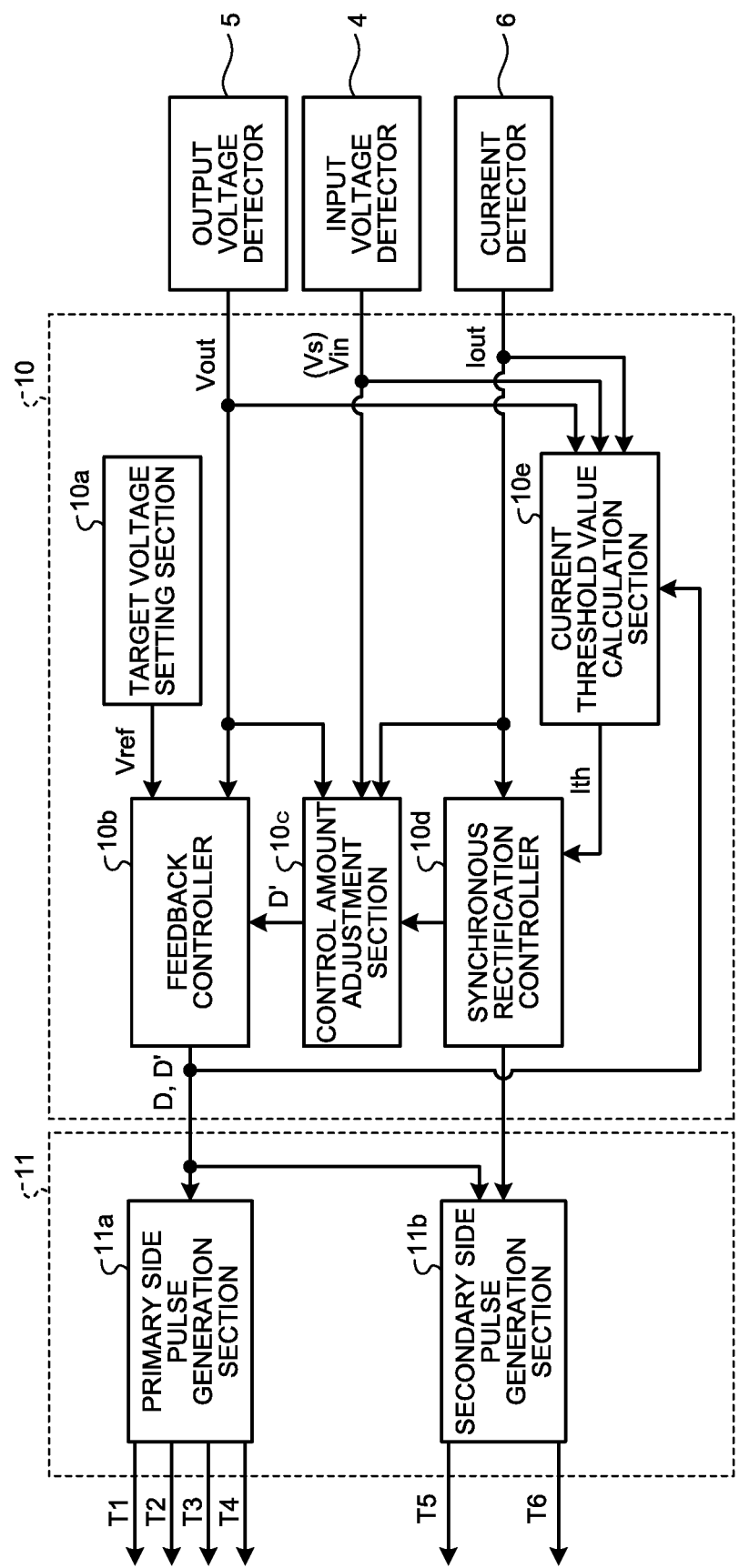
FIG. 2 is a block diagram illustrating a controller in the first embodiment.
Figure 4A:
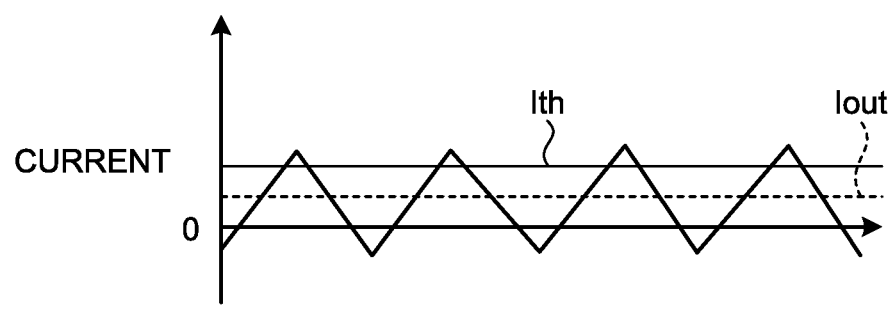
FIGS. 4A and 4B are diagrams illustrating current waveforms in a current continuous mode and a current discontinuous mode, respectively.
Figure 4B:
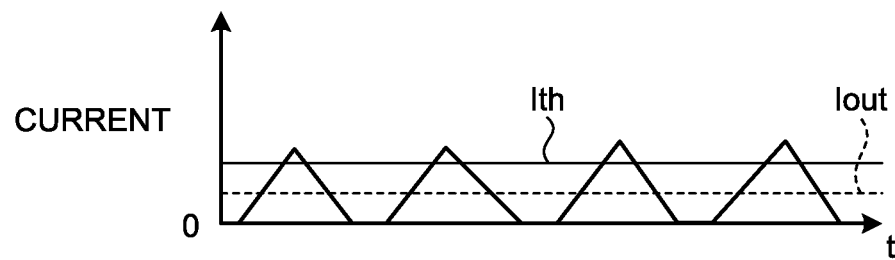

FIG. 1 is an overall diagram of a switching power supply device of a first embodiment. FIG. 2 is a block diagram illustrating a controller in the first embodiment. FIG. 3 is a flowchart illustrating an operation example of the switching power supply device in the first embodiment. FIGS. 4A and 4B are diagrams illustrating current waveforms in a current continuous mode and a current discontinuous mode, respectively. FIGS. 5A and 5B are diagrams illustrating an example of switching synchronous rectification control to asynchronous rectification control in a comparative example and the first embodiment, respectively.

As illustrated in FIG. 1, a switching power supply device 1 according to the present embodiment constitutes a DC/DC converter mounted in a vehicle such as an automobile, for example. The DC/DC converter includes the switching power supply device 1, a power source 2, and a load 3. The DC/DC converter has a function of converting DC power input from the power source 2 into DC power having a predetermined voltage in the switching power supply device 1, and outputting the converted DC power to the load 3. Components, other than the switching power supply device 1, the power source 2, and the load 3 constituting the DC/DC converter, will not be described.

The power source 2, for example, is a battery of a relatively high voltage such as 48 V to 500 V and outputs a DC voltage. The power source 2 is connected to the switching power supply device 1 by a power source-side input terminal 2a and a power source-side output terminal 2b.

The load 3, for example, is a battery of a voltage lower than that of the power source 2 and is a battery of a relatively low voltage such as 12 V to 24 V. The load 3 is connected to the switching power supply device 1 by a load-side input terminal 3a and a load-side output terminal 3b.

The switching power supply device 1 is composed of an input voltage detector 4, an output voltage detector 5, a current detector 6, a switching circuit 7, a rectification circuit 8, a smoothing circuit 9, a controller 10, a pulse generation unit 11, a drive circuit 12, and a power source-side smoothing capacitor 13.

The input voltage detector 4 detects an input voltage Vin that is input to the switching circuit 7. The input voltage detector 4 has one end connected between the power source-side input terminal 2a and the switching circuit 7 and the other end connected to the controller 10. The input voltage Vin is output to the controller 10.

The output voltage detector 5 detects an output voltage Vout that is output from the smoothing circuit 9. The output voltage detector 5 has one end connected between the smoothing circuit 9 and the load-side input terminal 3a and the other end connected to the controller 10. The output voltage Vout is output to the controller 10.

The current detector 6 detects a detected current Iout flowing through the switching power supply device 1. The current detector 6 has one end connected between the smoothing circuit 9 and the load 3 and the other end connected to the controller 10. The detected current Iout is output to the controller 10.

The switching circuit 7 is a circuit that converts the DC voltage input from the power source 2 into an AC voltage. The switching circuit 7 includes four switching elements (first switching element) Q1 to Q4 and a transformer 7a.

The four switching elements Q1 to Q4 constitute a full-bridge inverter circuit. More specifically, the switching element Q1 and the switching element Q2 are connected in series with each other, the switching element Q3 and the switching element Q4 are connected in series with each other, and the switching elements Q1 and Q2 connected in series and the switching elements Q3 and Q4 connected in series are connected in parallel to each other. Each of the switching elements Q1 to Q4 is configured by a metal oxide semiconductor-field effect transistor (MOSFET), an insulated gate bipolar transistor (IGBT) and the like. The switching elements Q1 to Q4 in the illustrated example use n channel MOSFETs. Gate terminals of the switching elements Q1 to Q4 are connected to the drive circuit 12. The switching elements Q1 to Q4 are driven based on pulse signals T1 to T4 from the drive circuit 12.

The transformer 7a transforms the AC voltage converted by the full-bridge circuit and outputs the transformed voltage to the rectification circuit 8. The transformer 7a has a primary winding L1 and a secondary winding L2 that are insulated from each other. The transformer 7a changes the amount of transformation by a turn ratio Ns/Np of the primary winding L1 and the secondary winding L2. The primary winding L1 has one end connected between the switching element Q1 and the switching element Q2 and the other end connected between the switching element Q3 and the switching element Q4. As illustrated in FIG. 1, the secondary winding L2 forms a branch point CT at which the number of turns of the secondary winding L2 is approximately equally divided into two. The branch point CT may not be formed at the position where the number of turns of the secondary winding L2 is equally divided into two, and may be formed such that the number of turns is biased. The secondary winding L2 is connected to the rectification circuit 8.

The rectification circuit 8 is a circuit that converts the AC voltage converted by the switching circuit 7 into a DC voltage. The rectification circuit 8 is composed of two switching elements Q5 and Q6 (second switching element). The switching elements Q5 and Q6 are composed of a MOSFET, an IGBT and the like, for example. The switching element Q5 is connected between one end of the secondary winding L2 of the transformer 7a and the load-side output terminal 3b. The switching element Q6 is connected between the other end of the secondary winding L2 of the transformer 7a and the load-side output terminal 3b. Gate terminals of the switching elements Q5 and Q6 are connected to the drive circuit 12 and are driven based on pulse signals T5 and T6 from the drive circuit 12. The switching elements Q5 and Q6 are driven in synchronization with the switching circuit 7 during synchronous rectification control and are driven independently of the switching circuit 7 during asynchronous rectification control. The switching elements Q5 and Q6 rectify the AC voltage converted by the switching circuit 7 and convert the rectified voltage into a DC voltage.

The smoothing circuit 9 smooths the DC voltage rectified by the rectification circuit 8 and outputs the smoothed voltage to the load 3. The smoothing circuit 9 is composed of a choke coil 9a and a capacitor 9b. The choke coil 9a is connected in series with the branch point CT of the secondary winding L2 between the branch point CT of the secondary winding L2 and the load-side input terminal 3a. The capacitor 9b is connected between the load-side input terminal 3a and the load-side output terminal 3b and is connected in parallel to the choke coil 9a.

The controller 10 switches the synchronous rectification control, interrupt control, and the asynchronous rectification control, and performs feedback control on each of the switching elements Q1 to Q6. In the synchronous rectification control, the switching elements Q5 and Q6 of the rectification circuit 8 are driven in synchronization with the switching circuit 7.

In the interrupt control, when switching the synchronous rectification control to the asynchronous rectification control, the driving of the switching circuit 7 is controlled by replacing feedback control based on a normal duty D with a switching duty D'. In the asynchronous rectification control, the switching elements Q5 and Q6 of the rectification circuit 8 are not synchronized with the switching circuit 7 and are driven independently. The controller 10 is composed of a target voltage setting section 10a, a feedback control section 10b, a control amount adjustment section 10c, a synchronous rectification control section 10d, and a current threshold value calculation section 10e.

The target voltage setting section 10a transmits a preset target voltage Vref to the feedback control section 10b. The target voltage Vref is determined based on a voltage value to be output from the voltage of the power source 2 to the load 3.

The feedback control section 10b compares the target voltage Vref with the output voltage Vout, and performs control (feedback control) such that the output voltage Vout approaches the target voltage Vref by adjusting a duty. The feedback control section 10b outputs the normal duty D, which is determined from the target voltage Vref and the output voltage Vout, to the pulse generation unit 11 and the current threshold value calculation section 10e, and performs the feedback control by using the normal duty D. Furthermore, when the switching duty D' to be described below is input from the control amount adjustment section 10c, the feedback control section 10b replaces the normal duty D with the switching duty D' for performing the interrupt control, and outputs the switching duty D' to the pulse generation unit 11 and the current threshold value calculation section 10e.

The control amount adjustment section 10c determines the switching duty D' to be replaced by the normal duty D when the interrupt control is performed. The switching duty D' is an ideal value of a duty when a current flows through the choke coil 9a in the asynchronous rectification control, and is determined by the following Equations (1) and (2).

$$D' = \sqrt{\frac{2VoutIoutLfsw}{Vs^2 - VsVout}} \quad (1)$$

$$Vs = \frac{Ns}{Np}Vin \quad (2)$$

In Equations (1) and (2) above, Vs and Vin denote input voltages, Vout denotes an output voltage, Iout denotes a detected current, fsw denotes a switching frequency, L denotes an inductance value of the choke coil 9a, Np denotes the number of turns of the primary winding L1 of the transformer 7a, and Ns denotes the number of turns of the secondary winding L2 of the transformer 7a.

The synchronous rectification control section 10d outputs a signal, which indicates whether to perform the synchronous rectification control or the asynchronous rectification control, to the pulse generation unit 11 and the control amount adjustment section 10c. Furthermore, in the present embodiment, when the detected current value Iout becomes equal to or less than a current threshold value Ith determined by the current threshold value calculation section 10e to be described below (time point t1), the synchronous rectification control section 10d outputs a switching signal for switching the synchronous rectification control to the asynchronous rectification control.

The current threshold value calculation section 10e determines the current threshold value Ith based on the input voltage value Vs (Vin), the output voltage value Vout, the detected current value Iout, and the normal duty D.

The pulse generation unit 11 generates the pulse signals T1 to T6 based on the normal duty D or the switching duty D' received from the controller 10. The pulse generation unit 11 transmits the generated pulse signals T1 to T6 to the drive circuit 12. The pulse generation unit 11 includes a primary side pulse generation section 11a and a secondary side pulse generation section 11b. The primary side pulse generation section 11a generates the pulse signals T1 to T4 corresponding to the switching elements Q1 to Q4 of the switching circuit 7. The secondary side pulse generation section 11b generates the pulse signals T5 and T6 corresponding to the switching elements Q5 and Q6 of the rectification circuit 8. When the switching signal or a signal of the asynchronous rectification control is received from the synchronous rectification control section 10d, the secondary side pulse generation section 11b generates the pulse signals T5 and T6 for driving the switching elements Q5 and Q6 independently of the switching circuit 7 and turning off the switching elements Q5 and Q6.

The drive circuit 12 is connected to the gate terminals of the switching elements Q1 to Q6, and drives the switching elements Q1 to Q6 based on the pulse signals T1 to T6 received from the pulse generation unit 11.

The power source-side smoothing capacitor 13 smooths the DC voltage input from the power source 2. The power source-side smoothing capacitor 13 has one end connected between the power source-side input terminal 2a and the switching element Q1 and the other end connected between the switching element Q2 and the power source-side output terminal 2b.

The operation of the switching power supply device 1 will be described. First, a DC voltage is input from the power source 2 to the switching power supply device 1. Next, the input DC voltage is smoothed by the power source-side smoothing capacitor 13.

Next, the switching circuit 7 converts the smoothed DC voltage into an AC voltage. More specifically, the switching circuit 7 drives the switching elements Q1 to Q4 to allow the alternate occurrence of a state where the switching elements Q2 and Q3 are turned off when the switching elements Q1 and Q4 are turned on and the switching elements Q1 and Q4 are turned off when the switching elements Q2 and Q3 are turned on, thereby converting the DC voltage into the AC voltage. In both cases of the synchronous rectification control and the asynchronous rectification control, the switching elements Q1 to Q4 are feedback-controlled by the normal duty D. Furthermore, during the interrupt control, the switching elements Q1 to Q4 are driven and controlled by the switching duty D'. The converted AC voltage is transformed from a high voltage to a low voltage by the transformer 7a.

Next, the transformed AC voltage is rectified to a DC voltage by the rectification circuit 8. The rectification circuit 8 performs an operation of any one of the synchronous rectification control, the interrupt control, and the asynchronous rectification control in accordance with a signal from the synchronous rectification control section 10d. Furthermore, when the synchronous rectification control is switched to the asynchronous rectification control, control is switched in the order of the synchronous rectification control, the interrupt control, and the asynchronous rectification control.

In the synchronous rectification control, the AC voltage is rectified by turning on/off the switching elements Q5 and Q6 in synchronization with the switching circuit 7 such that the switching element Q5 of the rectification circuit 8 is turned on and the switching element Q6 of the rectification circuit 8 is turned off when the switching elements Q1 and Q4 of the switching circuit 7 are turned on and the switching element Q6 is turned on and the switching element Q5 is turned off when the switching elements Q2 and Q3 are turned on, so that the AC voltage is converted into the DC voltage. In such a case, a current continuous mode illustrated in FIG. 4A is set. In the current continuous mode, since the switching elements Q5 and Q6 allow current backflow, a current of even 0 A or less flows continuously.

In the interrupt control, when the switching signal is output from the synchronous rectification control section 10d, the driving of the switching circuit 7 is controlled by the switching duty D'. In such a case, the switching elements Q5 and Q6 are not synchronized with the switching circuit 7 and are turned off.

In the asynchronous rectification control, the switching elements Q5 and Q6 are not synchronized with the switching circuit 7 and are kept in the turned-off state unless an on signal is received. The switching elements Q5 and Q6 perform diode rectification on the AC voltage input from the switching circuit 7 with a built-in diode and convert the AC voltage into the DC voltage. In such a case, a current discontinuous mode illustrated in FIG. 4B is set. In the current discontinuous mode, since no current of 0 A or less flows, a current flows discontinuously.

Next, the DC voltage rectified by the rectification circuit 8 is smoothed by the smoothing circuit 9. The smoothed DC voltage is output to the load 3 and the conversion from the DC high voltage to the DC low voltage is completed.

Next, the operation of the controller 10 will be described using the flowchart of FIG. 3. At step ST1, the current detector 6 detects the detected current Iout flowing through the switching power supply device 1 and outputs the detected current Iout to the controller 10. In such a case, the switching circuit 7 and the rectification circuit 8 are feedback-controlled by the normal duty D and are subjected to synchronous rectification control.

At step ST2, the synchronous rectification control section 10d determines whether the detected current Iout is equal to or less than the current threshold value Ith.

When the detected current Iout is equal to or less than the current threshold value Ith (Yes at step ST2) at step ST2, the procedure proceeds to step ST3 and the synchronous rectification control section 10d outputs a switching signal to the secondary side pulse generation section 11b and the control amount adjustment section 10c. The secondary side pulse generation section 11b having received the switching signal switches the synchronous rectification control to the interrupt control and turns off the switching elements Q5 and Q6. Furthermore, the control amount adjustment section 10c having received the switching signal determines the switching duty D' based on Equations (1) and (2) above and outputs the switching duty D' to the feedback control section 10b.

At step ST4, the feedback control section 10b having received the switching duty D' outputs the switching duty D' to the pulse generation unit 11 so as to perform the interrupt control by replacing the feedback control based on the normal duty D with the switching duty D'. In such a case, the switching elements Q5 and Q6 are not controlled by the switching duty D' and are turned off.

At step ST5, when the signal of the asynchronous rectification control is received from the synchronous rectification control section 10d, the feedback control section 10b changes the switching duty D' to the feedback control based on the normal duty D and performs the asynchronous rectification control.

When the detected current Iout is larger than the current threshold value Ith (No at step ST2) at step ST2, the procedure returns to step ST1 and the detected current Iout is repeatedly detected until the detected current Iout becomes equal to or less than the current threshold value Ith. Furthermore, in such a case, the switching elements Q1 to Q6 are feedback-controlled by the normal duty D and are subjected to synchronous rectification control.

In the comparative example illustrated in FIG. 5A, a fluctuation occurs in the output voltage when the detected current Iout is equal to or less than the current threshold value Ith and when switching the synchronous rectification control to the asynchronous rectification control (time point t1). On the other hand, according to the switching power supply device 1 in the aforementioned first embodiment, as illustrated in FIG. 5B, the normal duty D used for the feedback control is replaced with the switching duty D' to perform the interrupt control, so that it is possible to suppress a fluctuation in the output voltage at the time point t1. Thus, durability of the connected each element, load and the like is improved and power can be stably supplied to the load.

Second Embodiment

Figure 6:
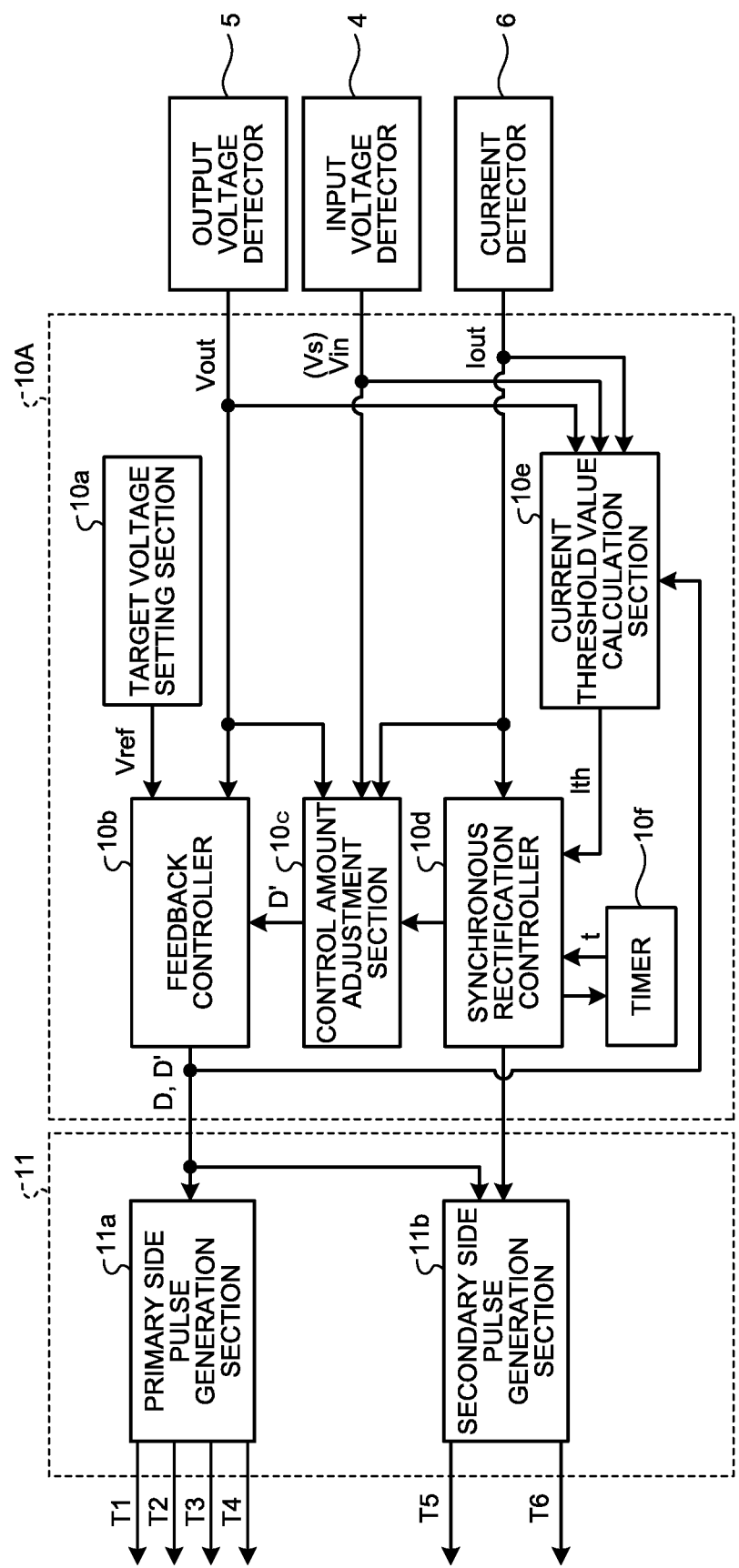
FIG. 6 is a block diagram illustrating a controller in a second embodiment.
Figure 7:
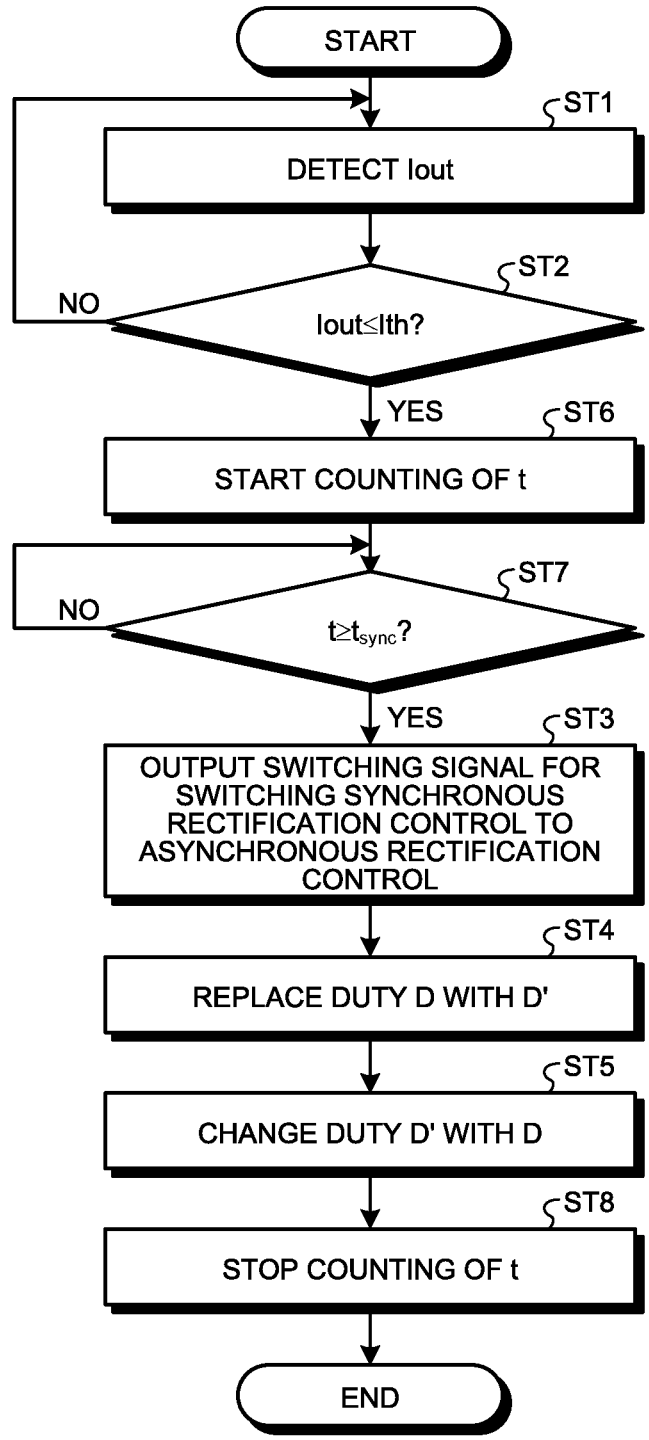
FIG. 7 is a flowchart of an operation example of a switching power supply device in the second embodiment.
Figure 8:
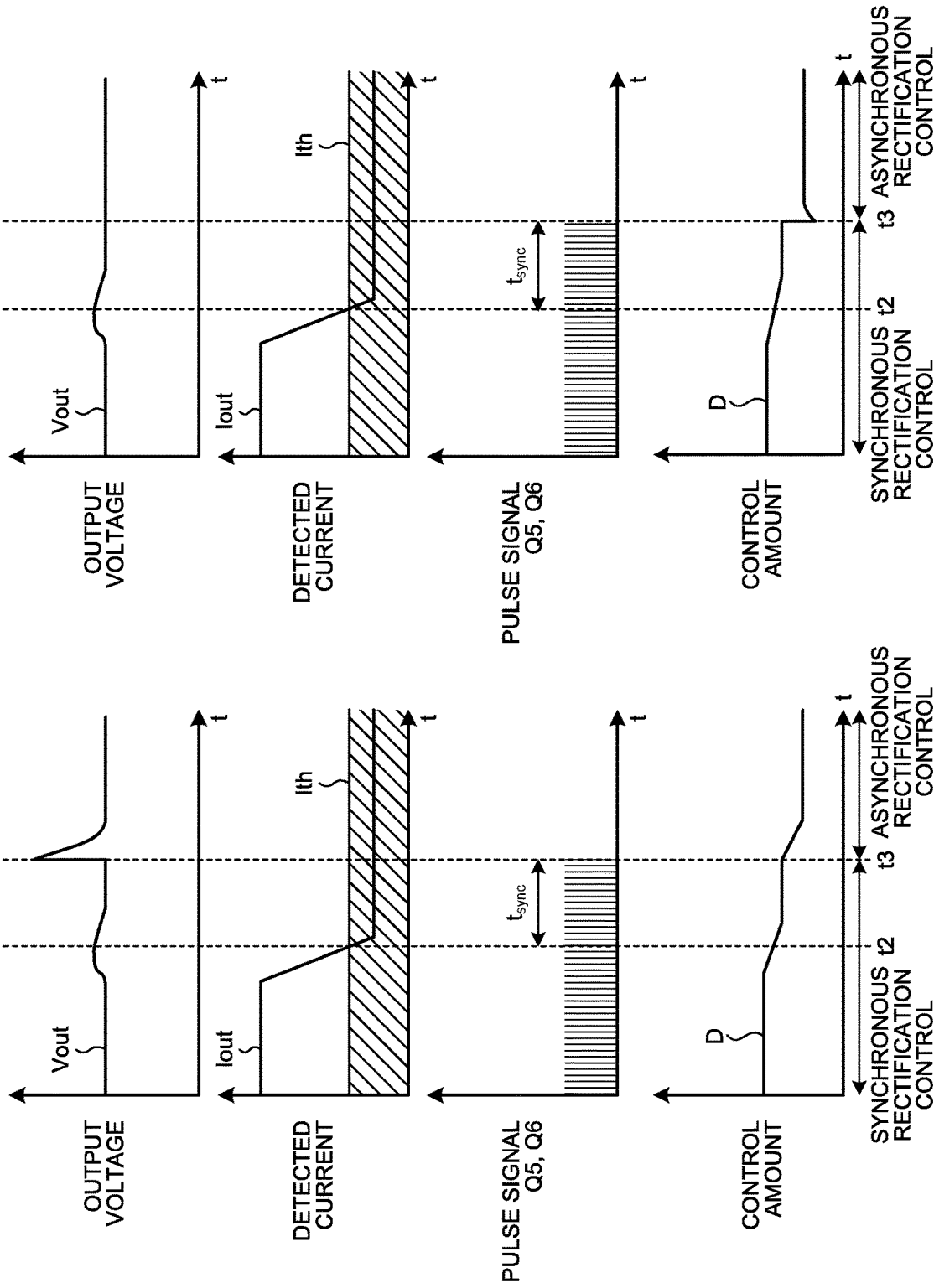
FIGS. 8A and 8B are diagrams illustrating an example of switching synchronous rectification control to asynchronous rectification control in a comparative example and the second embodiment, respectively.

Next, other embodiments will be described. The same components as those of the first embodiment are denoted by the same reference numerals and a description thereof will be appropriately omitted. FIG. 6 is a block diagram illustrating a controller in a second embodiment. FIG. 7 is a flowchart illustrating an operation example of a switching power supply device in the second embodiment. FIGS. 8A and 8B are diagrams illustrating switching synchronous rectification control to asynchronous rectification control in a comparative example and the second embodiment, respectively.

The switching power supply device 1 according to the second embodiment switches synchronous rectification control to asynchronous rectification control after the detected current Iout becomes equal to or less than the current threshold value Ith and then a delay time tsync elapses.

A controller 10A includes a timer 10f illustrated in FIG. 6, in addition to the components of the first embodiment. The timer 10f measures an elapsed time t starting from the time point t2 illustrated in FIGS. 8A and 8B when the detected current Iout becomes equal to or less than the current threshold value Ith. The timer 10f outputs the elapsed time t to the synchronous rectification control section 10d.

The synchronous rectification control section 10d compares the delay time tsync set in advance with the elapsed time t, and determines whether to switch the synchronous rectification control to the asynchronous rectification control. When the detected current Iout becomes equal to or less than the current threshold value Ith (time point t2), the synchronous rectification control section 10d outputs a count start signal that causes the timer 10f to start counting the elapsed time t. When the elapsed time t becomes equal to or more than the delay time tsync (time point t3), the synchronous rectification control section 10d outputs a switching signal for switching the synchronous rectification control to the asynchronous rectification control to the control amount adjustment section 10c and the secondary side pulse generation section 11b.

Next, the operation of the switching power supply device 1 will be described using the flowchart of FIG. 7. At step ST1, the current detector 6 detects the detected current Iout and outputs the detected current Iout to the controller 10A. At step ST2, the synchronous rectification control section 10d determines whether the detected current Iout is equal to or less than the current threshold value Ith.

When the detected current Iout is equal to or less than the current threshold value Ith (Yes at step ST2), the procedure proceeds to step ST6 and the synchronous rectification control section 10d outputs a count start signal to the timer 10f. The timer 10f having received the count start signal starts counting the elapsed time t. The timer 10f outputs the elapsed time t to the synchronous rectification control section 10d.

At step ST7, the synchronous rectification control section 10d determines whether the elapsed time t is equal to or more than the delay time tsync.

When the elapsed time t is equal to or more than the delay time tsync (Yes at step ST7), the procedure proceeds to step ST3 and the synchronous rectification control section 10d outputs a switching signal to the control amount adjustment section 10c and the secondary side pulse generation section 11b. Furthermore, the control amount adjustment section 10c having received the switching signal determines the switching duty D' based on Equations (1) and (2) above and outputs the switching duty D' to the feedback control section 10b.

At step ST4, the feedback control section 10b having received the switching duty D' outputs the switching duty D' to the pulse generation unit 11 so as to perform the interrupt control by replacing the normal duty D with the switching duty D'.

At step ST5, when the signal of the asynchronous rectification control is received from the synchronous rectification control section 10d, the feedback control section 10b changes the switching duty D' to the feedback control based on the normal duty D and performs the asynchronous rectification control.

At step ST8, when the signal of the asynchronous rectification control is received from the synchronous rectification control section 10d, the timer 10f stops counting the elapsed time t and sets the count to 0.

When the detected current Iout is larger than the current threshold value Ith (No at step ST2) at step ST2, the procedure returns to step ST1 and the detected current Iout is repeatedly detected until the detected current Iout becomes equal to or less than the current threshold value Ith. Furthermore, in such a case, the switching elements Q1 to Q6 are feedback-controlled by the normal duty D and are subjected to synchronous rectification control.

When the elapsed time t is less than the delay time tsync (No at step ST7) at step ST7, the procedure returns to step ST7 and the synchronous rectification control section 10d repeats step ST7 until the elapsed time t becomes equal to or more than the delay time tsync. Furthermore, in such a case, the switching elements Q1 to Q6 are feedback-controlled by the normal duty D and are subjected to synchronous rectification control.

In the comparative example illustrated in FIG. 5A, a fluctuation occurs in the output voltage at the time point t1 at which the detected current Iout becomes equal to or less than the current threshold value Ith. According to the switching power supply device 1 in the second embodiment, as illustrated in FIG. 8B, the synchronous rectification control is switched to the asynchronous rectification control after the delay time tsync elapses from the time point t2 at which the detected current Iout becomes equal to or less than the current threshold value Ith, so that it is possible to suppress a fluctuation in the output voltage at the time point t2.

However, in the comparative example illustrated in FIG. 8A, when the synchronous rectification control is switched to the asynchronous rectification control at the time point t3 at which the delay time tsync has elapsed from the state where the detected current Iout becomes equal to or less than the current threshold value Ith, a slight fluctuation occurs in the output voltage. According to the switching power supply device 1 in the second embodiment, as illustrated in FIG. 8B, it is possible to suppress a fluctuation in the output voltage by performing the interrupt control by replacing the control amount with the switching duty D' at the time point t3. Thus, durability of the connected each element, load and the like is improved and power can be stably supplied to the load.

Figure 9:
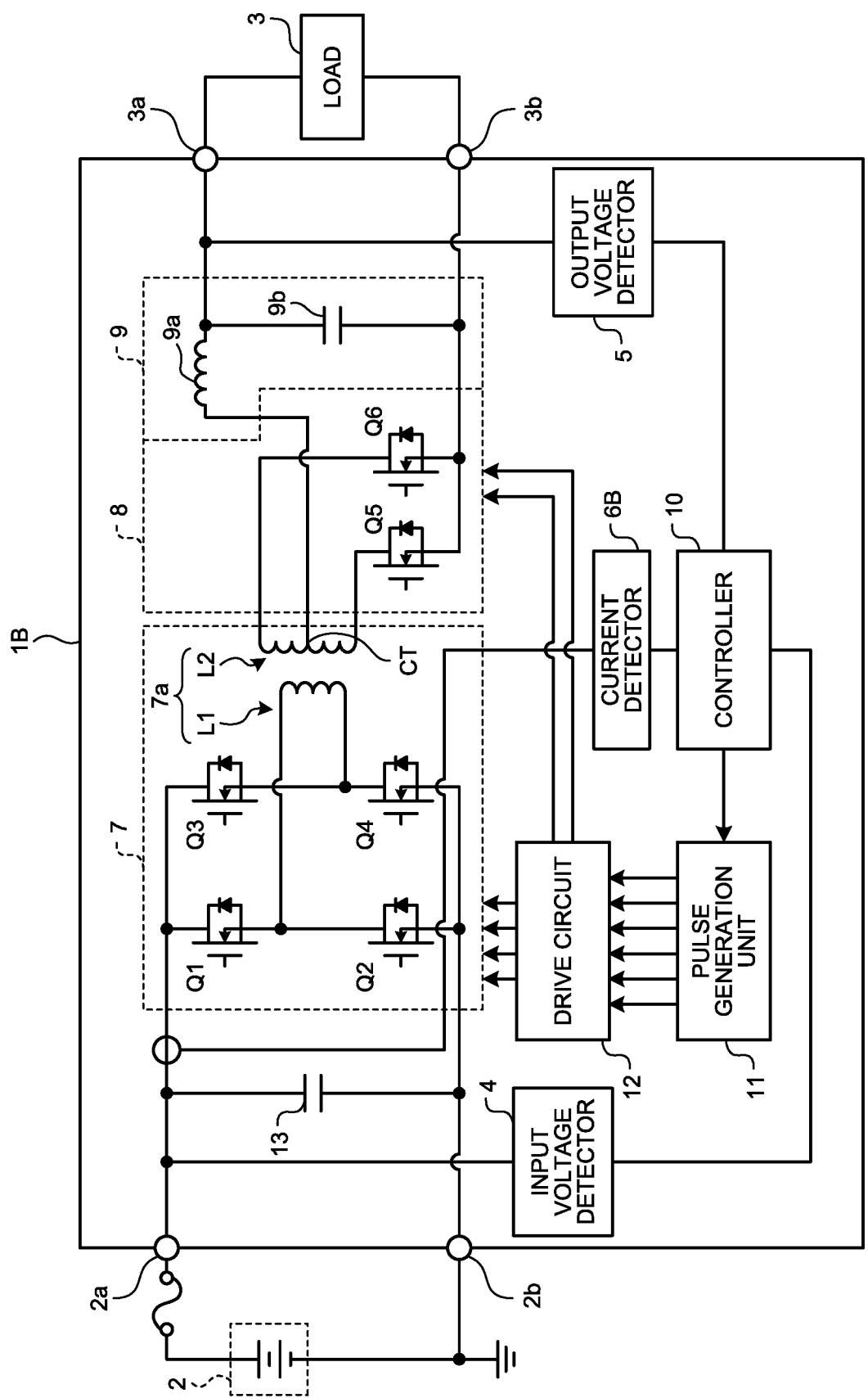
FIG. 9 is an overall diagram illustrating a modified example of a switching power supply device in an embodiment.
Figure 10:
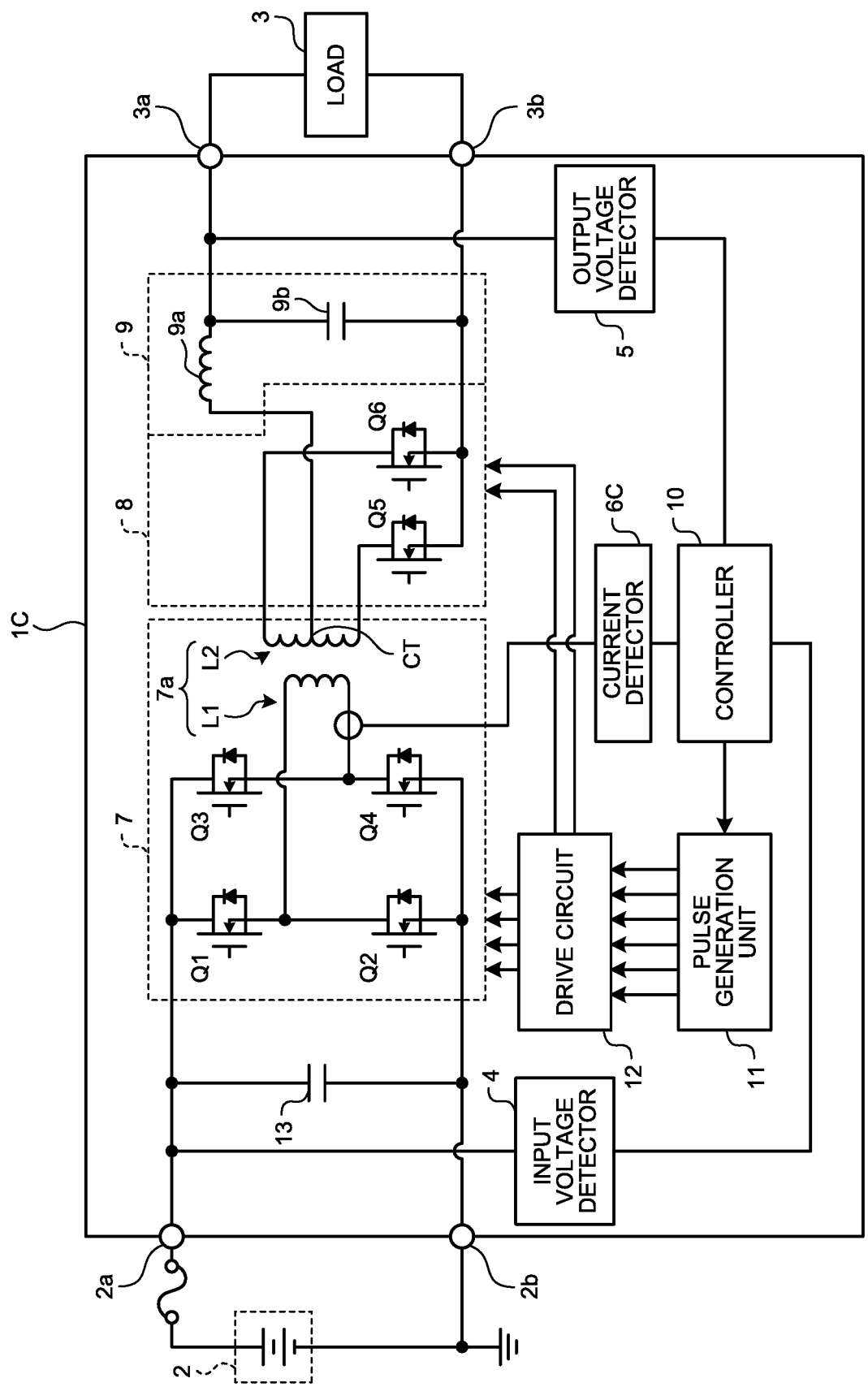
FIG. 10 is an overall diagram illustrating a switching power supply device in a modified example.

Furthermore, in the aforementioned embodiments, the connection position of the current detector 6 is not limited. For example, current detectors 6B and 6C may be connected as in switching power supplies 1B and 1C of FIG. 9 and FIG. 10. In FIG. 9, the current detector 6B is connected to the power source 2 side. More specifically, the current detector 6B has one end connected between the power source-side input terminal 2a and the switching element Q1 and the other end connected to the controller 10. In FIG. 10, the current detector 6C is connected in the vicinity of the transformer 7a. More specifically, the current detector 6C has one end connected between the primary winding L1 of the transformer 7a and the switching element Q4 and the other end connected to the controller 10.

Figure 11:
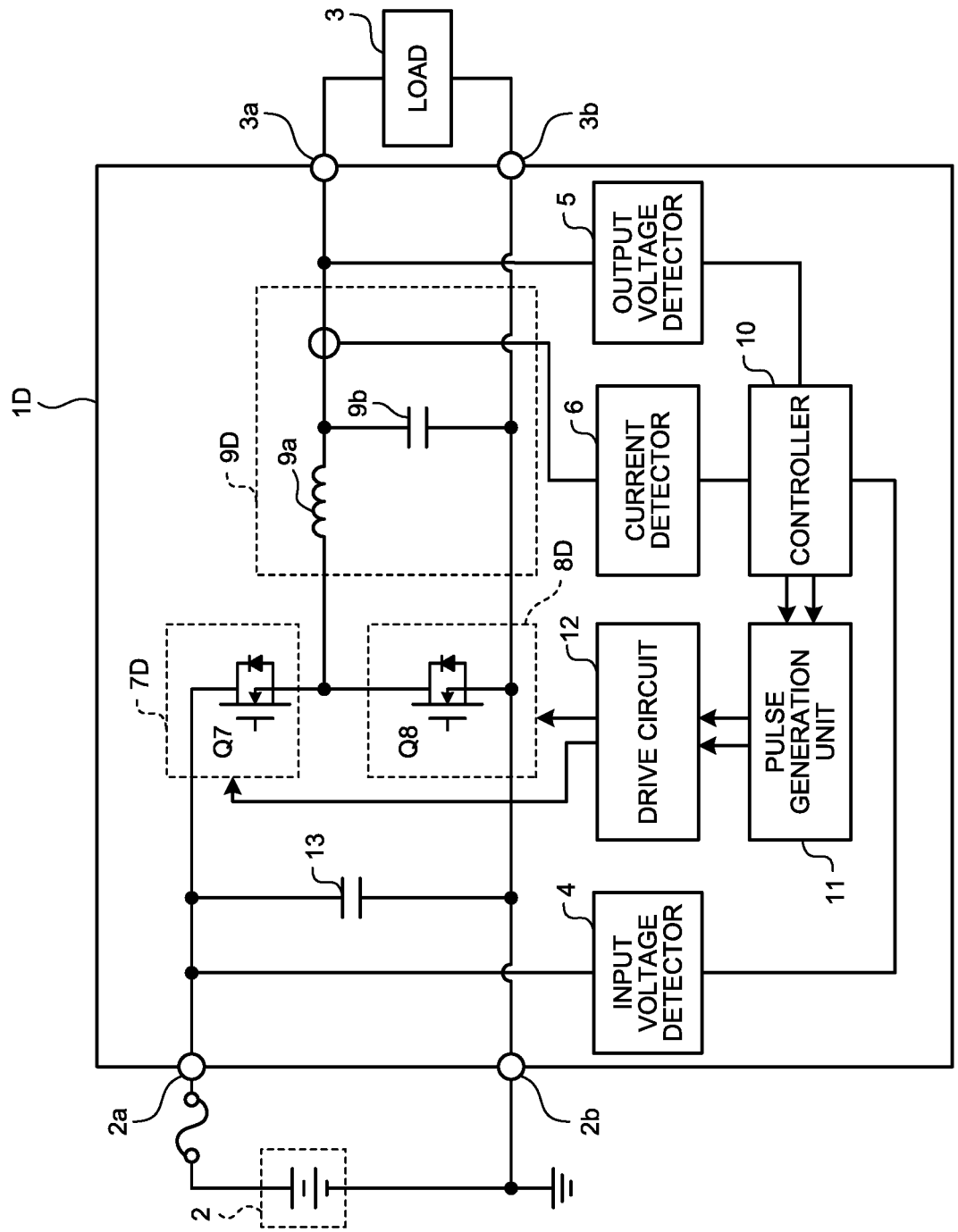
FIG. 11 is an overall diagram illustrating a switching power supply device in a modified example.

Furthermore, as illustrated in FIG. 11, a switching power supply device 1D may be configured as a half-bridge circuit by a switching circuit 7D and a rectification circuit 8D.

The switching circuit 7D is composed of a switching element Q7. The switching element Q7 is connected between the power source-side input terminal 2a and the rectification circuit 8D. A gate terminal of the switching element Q7 is connected to the drive circuit 12. The switching element Q7 is driven based on a pulse signal T7 (not illustrated) from the drive circuit 12. The pulse signal T7 is generated by the pulse generation unit 11.

The rectification circuit 8D is composed of a switching element Q8. The switching element Q8 is connected between the switching circuit 7D and the power source-side output terminal 2b. A gate terminal of the switching element Q8 is connected to the drive circuit 12. The switching element Q8 is driven based on a pulse signal T8 (not illustrated) from the drive circuit 12. The pulse signal T8 is generated by the pulse generation unit 11.

Even when the switching power supply device 1D is configured as the half-bridge circuit, it is possible to suppress a fluctuation in the output voltage, durability of the connected each element, load and the like is improved, and power can be stably supplied to the load.

In accordance with the switching power supply device according to the present embodiment, when switching the synchronous rectification control to the asynchronous rectification control, the feedback control based on the normal duty is replaced with the switching duty that is an ideal value in the asynchronous rectification control, thereby achieving an effect that it is possible to suppress a fluctuation in an output voltage, which occurs when switching to the asynchronous rectification control.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A switching power supply device comprising:
a switching circuit that converts a DC voltage into an AC voltage and includes a first switching element;
a rectification circuit that rectifies the AC voltage converted by the switching circuit into a rectified DC voltage and includes a second switching element;
a smoothing circuit that smooths the rectified DC voltage;
a controller that performs switching between synchronous rectification control for driving the second switching element in synchronization with the switching circuit and asynchronous rectification control for driving the second switching element independently of the switching circuit, and performs feedback control on the first switching element and the second switching element;
an input voltage detector that detects an input voltage that is input to the switching circuit;
an output voltage detector that detects and output voltage that is output from the smoothing circuit; and
a current detector that detects a current flowing through the switching circuit or the rectification circuit,
wherein when switching the synchronous rectification control to the asynchronous rectification control, the controller changes from a normal duty cycle to a switching duty cycle and performs the feedback control of the switching circuit and the rectification circuit based on the normal duty cycle after the synchronous rectification control is switched to the asynchronous rectification control,
the normal duty cycle is determined based on the output voltage, and
the switching duty cycle is determined based on the input voltage, the output voltage, a detected current value, a switching frequency, and an inductance value of the rectification circuit.

2. The switching power supply device according to claim 1, wherein the switching duty cycle determined by Equations (1) and (2) below, $$D' = \sqrt{\frac{2 Vout Iout L fsw}{Vs^2 - Vs Vout}} \quad (1)$$

$$Vs = \frac{Ns}{Np} Vin \quad (2)$$

where Vin denotes the input voltage, Vs denotes a calculated input voltage, Vout denotes the output voltage, Iout denotes the detected current value, fsw denotes the switching frequency, L denotes the inductance value, Np denotes a number of turns of a primary winding of a transformer, and Ns denotes a number of turns of a secondary winding of the transformer.

3. The switching power supply device according to claim 1, wherein the controller switches the synchronous rectification control to the asynchronous rectification control after a predetermined time from a time point at which the detected current value in the synchronous rectification control becomes equal to or less than a predetermined current value.

4. The switching power supply device according to claim 2, wherein the controller switches the synchronous rectification control to the asynchronous rectification control after a predetermined time from a time point at which the detected current value in the synchronous rectification control becomes equal to or less than a predetermined current value.

* * * * *